United States Patent
Rubsam-Tomlinson

[19]

[11] Patent Number: 5,938,305
[45] Date of Patent: Aug. 17, 1999

[54] COMPOST AND DRY STORAGE ENCLOSURE APPARATUS

[76] Inventor: Virginia T. Rubsam-Tomlinson, 201 Norwood Rd., Annapolis, Md. 21401

[21] Appl. No.: 08/838,527

[22] Filed: Apr. 8, 1997

Related U.S. Application Data

[60] Provisional application No. 60/027,262, Oct. 1, 1996.

[51] Int. Cl.⁶ .................................................. A47B 96/00
[52] U.S. Cl. ................................... 312/270.1; 312/270.3; 312/330.1; 220/909
[58] Field of Search ............................. 312/270.1, 270.3, 312/273, 211, 212, 330.1, 310, 301, 274, 298; 220/909, 23.4, 500, 23.88

[56] References Cited

U.S. PATENT DOCUMENTS

| | | | |
|---|---|---|---|
| 2,699,368 | 1/1955 | Selmer | 312/270.3 |
| 3,528,718 | 9/1970 | Johnson et al. | 312/270.3 X |
| 3,556,619 | 1/1971 | Bottas et al. | 32/211 X |
| 4,653,818 | 3/1987 | DeBruyn | 312/301 X |
| 4,744,614 | 5/1988 | Gombosi | 220/23.4 X |
| 5,634,702 | 6/1997 | Fistonich | 312/270.3 |

FOREIGN PATENT DOCUMENTS

| | | | |
|---|---|---|---|
| 3024822 | 1/1982 | Germany | 220/909 |
| 3516547 | 11/1986 | Germany | 220/909 |

OTHER PUBLICATIONS

C. H. Briggs Hardware Co,; Product Brochure, p. D–14 to D–18 (No Date Given).
H'A'Fele; Trash Cans Brochure; pp. 5.35 through 5.37 (No Date Given).
Blanco/Brochure/Containers/Cabinets/Blanco Box System/Undermounts Sink/Eight Pages (No Date Given).
BPOW/BWB/Product Brochure/Pullout Waste Basket/Base Waste Basket; p. F–12 (No Date Given).
Anchor Hocking Plastics—Products for the Pantry; Stow-Away (tm) Nesting Containers/Product Brochure (2 pages) (No Date Given).
Baer Product Catalog; Cabinet & Counter Accessories; pp. F–626 through F–629 (No Date Given).

*Primary Examiner*—Peter M. Cuomo
*Assistant Examiner*—James O. Hansen
*Attorney, Agent, or Firm*—Daniel J. Meaney, Jr.

[57] ABSTRACT

A compost and dry storage enclosure apparatus for use as a subassembly for a pull out base cabinet is shown. The apparatus includes a housing having a generally planar support with an opening of a predetermined shape and cross-sectional area and a circumferential edge around the opening The apparatus preferably includes first container which is formed of a material substantially impervious to moisture for receiving and storing material containing a high level of moisture for use in a compost mixture. The first container further includes a removable cover to form a removable fluid tight seal to contain the moisture and odor of the stored material containing moisture within the first container. The first container is located at a first predetermined position within the opening in the housing and is supported therein by the circumferential edge. The apparatus also includes a second container which is formed of a material for receiving and storing material containing a low level of moisture. The second container is located at a second predetermined position contiguous to the first container in the first predetermined position within the opening in the housing. The apparatus may include a plurality of containers.

9 Claims, 1 Drawing Sheet

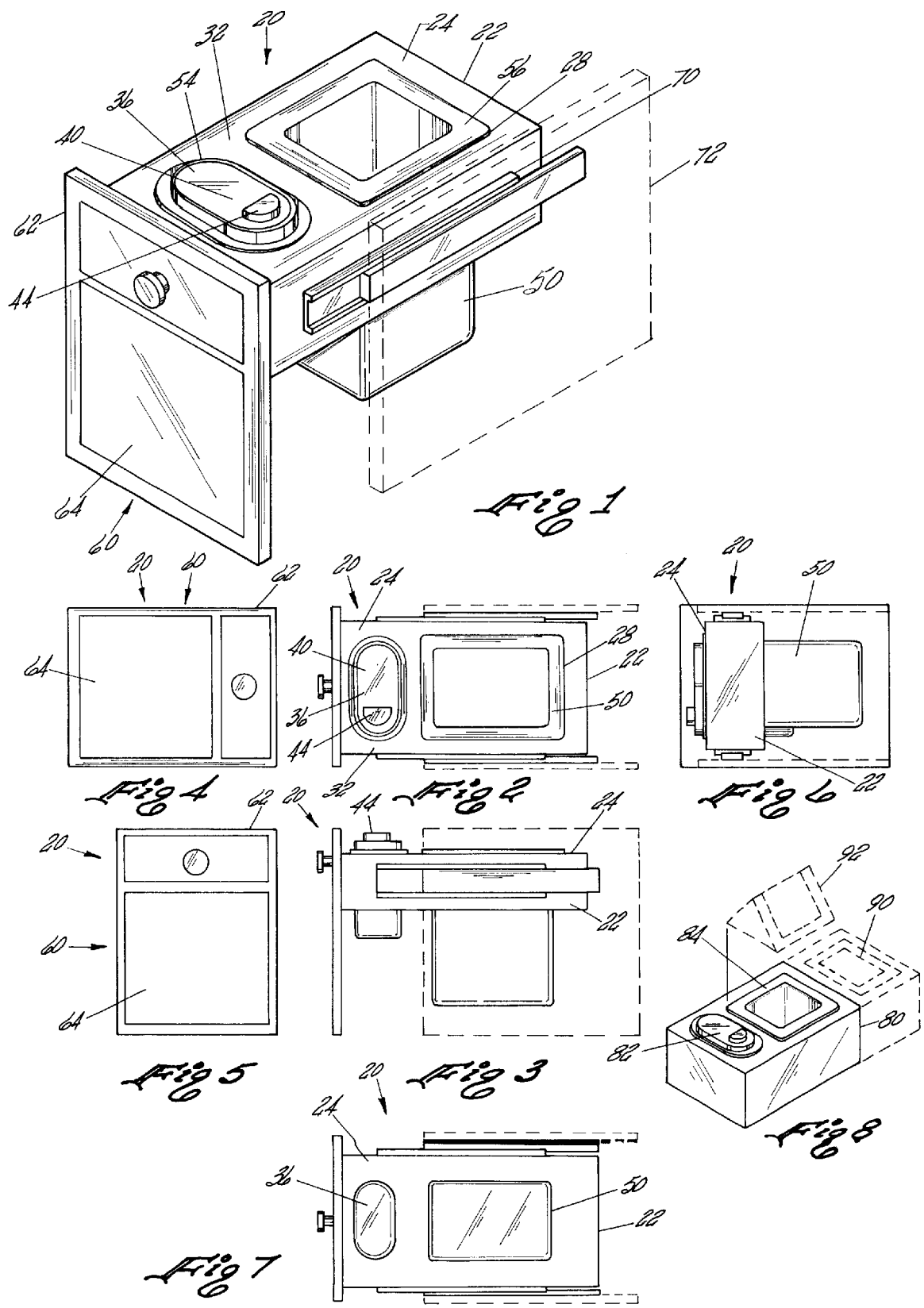

COMPOST AND DRY STORAGE ENCLOSURE APPARATUS

RELATED APPLICATION

This Application claims the benefit, under Title 35, United States Code §119(e), of United States Provisional patent application Ser. No.: 60/027,262 filed Oct. 1, 1996.

BACKGROUND OF THE INVENTION

1. Field of the Invention

This invention relates to a pull out waste material base cabinet and more particularly relates to a compost and dry storage enclosure apparatus for use as a subassembly for a cabinet. The apparatus includes a first container for receiving and storing wet materials, such as, for example, cuttings from fruit and vegetables, for use as a part of a compost mixture and a second container for storing dry material, such as for example paper and cardboard material, which is to can be discarded as rubbish or recycled as a renewable material source.

2. Background of the Invention

Base cabinets having a subassembly for forming a pull out waste basket are known in the art. An example of such a base cabinet in Model 454 by Corsi of Indianapolis, Ind.

Three bin recycling units or cabinets having three 20 quart bins with flip top lids are known in the art. The three bin recycling units have full extension slides making the bin completely accessible and allow for easy removal to the street or recycling area. The three bin recycling units fit either in an 18" or 21" wide cabinet.

SUMMARY OF THE INVENTION

This invention relates to a new, novel and unique compost and dry storage enclosure apparatus.

None of the known prior art base cabinets provide a pull out cabinet for storing waste wet materials and dry materials in a manner that the same can be easily deposited into the containers during normal cleaning up activities and which can be easily removed and/or recycled when the containers are full of waste materials. The known pullout cabinets have a single opening for holding a waste basket or plastic bag for receiving dry materials such as paper and cardboard. Some users elect to deposit wet material in the same container as the dry materials The recent environmental trends have resulted in apparatus, such as recycling bins, for segregating materials such as paper, cans, glass and plastic. The recycling bins typically are physically removed and placed at curbside for collection or dumped into a larger collecting container for recycling.

This environmental trend has resulted in a further refinement, namely, collecting materials of high moisture such as organic material generally known as wet garbage, consisting of cuttings from vegetables and fruits at its source, such as a kitchen, and using the same as part of a compost mixture for gardening or fertilizing flowers or vegetables.

The present invention overcomes the deficiencies of the known prior art apparatus. The compost and dry storage enclosure apparatus of the present invention includes a housing having a generally planar support member which defines an opening therein of a predetermined shape and cross-sectional area and having a circumferential edge around the opening. The apparatus further includes a first container having a first selected cross-sectional area and depth and which is formed of a material substantially impervious to moisture for receiving and storing material containing a high level of moisture for use in a compost mixture. The first container further includes a removable cover to form a removable fluid tight seal to contain the moisture and odor of the stored material containing moisture within the first container.

The first container is located at a first predetermined position within the opening in the housing and is supported in the first predetermined position by the circumferential edge. In the preferred embodiment, the first container may include a supporting member for hanging the first container from the circumferential edge of the opening for easy access and removal.

The apparatus also includes a second container having a second selected cross-sectional area and depth and being formed of a material for receiving and storing material containing a low level of moisture. The second container is located at a second predetermined position contiguous to the first container in the first predetermined position within the opening in the housing. The second container is supported in the second predetermined position by said circumferential edge. In the preferred embodiment, the second container may include a supporting member for hanging the second container from the circumferential edge of the opening for easy access and removal. The housing may enclose a plurality of containers, at least one of which includes a removable cover to form a removable fluid tight seal to contain the moisture and odor of the stored material containing moisture within the at least one container.

The first container and the second container are selected to have a total cross-sectional area which occupies substantially all of the cross-sectional area of the opening. If a plurality of containers are used, the containers occupy substantially all of the cross-sectional area of the opening in the housing.

One advantage of the present invention is that the compost and dry storage enclosure apparatus can be used as a pull out cabinet for use in a kitchen cabinet system.

Another advantage of the present invention is that the compost and dry storage enclosure apparatus can be used as a subassembly and be retrofitted into existing kitchen cabinets or cabinet systems.

Another advantage of the present invention is that the compost and dry storage enclosure apparatus can be used as a subassembly for a cabinet insert for a cabinet system for use in a wide variety of applications where the user desires to segregate material containing a high level of moisture for use in a compost mixture from materials material containing a low level of moisture. This has utility for recycling both types of materials.

BRIEF DESCRIPTION OF THE DRAWINGS

These and other advantages of the present invention can be understood and appreciated from the following detailed description of the preferred embodiment wherein:

FIG. 1 is a top, front and left side perspective view of a compost and dry material storage enclosure apparatus of the present invention;

FIG. 2 is a top plan view of the compost and dry material storage enclosure apparatus of the present invention;

FIG. 3 is a front elevational view of the compost and dry material storage enclosure apparatus of the present invention;

FIG. 4 is a left side elevational view of the compost and dry material storage enclosure apparatus of FIG. 2 of the present invention;

FIG. 5 is a left side elevational view of the compost and dry material storage enclosure apparatus of FIG. 3 of the present invention;

FIG. 6 is a right side elevational view of the compost and dry material storage enclosure apparatus of FIG. 2 of the present invention;

FIG. 7 is a bottom plane view of the compost and dry material storage enclosure apparatus of FIG. 2 of the present invention; and FIG. 8 is a pictorial representation of a first container and a second container in a housing wherein the housing is shown in phantom, and wherein the housing encloses a plurality of containers.

DESCRIPTION OF THE PREFERRED EMBODIMENT

FIGS. 1 through 7 disclose the preferred embodiment of a compost and dry storage enclosure apparatus, shown generally as 20, of the present invention. As illustrated in FIGS. 1, 2, 3, and 6, the compost and dry storage enclosure apparatus 20 includes a housing 22 having a generally planar support member 24.

As shown in FIGS. 1 and 3, the planar support member 24 defines a receiving opening 28 therein of a predetermined shape and cross-sectional area and having a circumferential edge 32 around the opening 28.

As shown in FIGS. 1, 2, 3 and 7, the apparatus 20 includes a first container 36 having a first selected cross-sectional area and depth. The first container 36 is formed of a material substantially impervious to moisture for receiving and storing material containing a high level of moisture for use in a compost mixture.

As shown in FIGS. 1 and 3, the first container 36 further includes a removable cover 40 to form a removable fluid tight seal to contain the moisture and odor of the stored material containing moisture within the first container 36. The first container 36 is located at a first predetermined position within the opening 28 in the housing 20 and is supported in said the predetermined position by said circumferential edge 32. The removable cover 40 includes a flip lid 42 to provide easy access for depositing wet material into the first container 36. The flip lid 42 is a receiving opening which permits material containing a low level of moisture to be deposited in the first container 36 through the receiving opening 28.

One example of such a container is a 2 quart (1.8 liter) plastic container Model No. 5856-12 or a 3.75 quart (3.5 liter) container and a Model No. 5849-14 removable top manufactured by Anchor Hocking. The removable top has a flip lid to provide easy access for depositing material into the first container 36.

The compost and dry storage enclosure apparatus includes a second container 50 having a second selected cross-sectional area and depth and which is formed of a material for receiving and storing material containing a low level of moisture. The second container 50 is located at a second predetermined position contiguous to the first container 36 in the first predetermined position within the opening 28 in the housing 22. The second container 50 is supported in the second predetermined position by the circumferential edge 24.

As illustrated in FIGS. 1, 2 and, the first container 36 and the second container 50 are selected to have a total cross-sectional area which occupies substantially all of the cross-sectional area of the opening 28.

As shown in FIG. 1, the first container 36 and the second container 50 each include a supporting member 54 and 56 for hanging the first container 36 and said second container 50 in the first predetermined position and the second predetermined position, respectively.

In the preferred embodiment, the compost and dry storage enclosure apparatus 20 the first selected cross-sectional area of the first container 36 is smaller than the second selected cross-sectional area of the second container 50. However, it is envisioned that the ratio of first cross-sectional to the second cross-sectional area of the could be in the order of about 5:1 to about 1:1 or greater. The limiting factor is the size of the opening 28 and the total cross-sectional area of first container 36 and second container 50 to be located therein.

As illustrated in FIGS. 1, 4 and 5, the apparatus may define a subassembly for a cabinet having a panel 60 forming a substantially vertical front panel for a cabinet. The panel 60 may include a top face 62 for a cabinet and a bottom face 64 depicting a cabinet door.

In this embodiment, the generally planar support member 22 is operatively coupled in a substantially perpendicular position to the panel 60. The opening 28 is likewise substantially perpendicular to the panel 60.

In addition, in the preferred embodiment, the subassembly of the apparatus may include a slider mechanism 70 operatively coupled the housing 20 to a cabinet frame, shown by dashed line 72, for supporting the housing 22, the first container 36 and the second container 50 within the cabinet frame 72 for forming a pull-out compost and dry storage cabinet section.

The ornamental design of a compost and dry storage apparatus and a subassembly for a cabinet, substantially as shown herein, in FIGS. 1 through 7 is also unique and has pleasing aesthetics.

FIG. 8 is a pictorial representation of a housing shown by housing 80 for supporting a first container 82 and a second container FIG. 8 also shows that a third container shown by dashed lines 90 may be included. Also a cover having a receiving opening shown by dashed lines 92 may be used to enclosed the second container 84. Although the preferred embodiment provides for hanging the first and second container from by means of a supporting member and a circumferential edge, it is envisioned that other support mechanisms may be used such as a collar, hook, Velcro or other similar holding devices as are well known the art.

It is also envisioned that the housing need not be located at the top of a cabinet panel. The housing may be located intermediate the cabinet panel.

Also, the invention is not limited to two containers, and may include a plurality of containers. For example, in FIG. 8. the housing 80 can be expanded to hold a third container 90 to collect other materials such as bottles, cans or plastic material The limiting factor is the size of the opening 28 and the total cross-sectional area of first container 36 and second container 50 to be located therein, as well as the width and depth of the cabinet.

Typically, kitchen base cabinets come in a variety of widths such as for example, 15", 18", 21" and 24". Typical depths of base cabinets is in the order of 24".

The subassembly for a cabinet can be designed to retrofit existing cabinets. In the alternative, the subassembly can be incorporated as a modular unit for use with or as an insert in to or as a base cabinet for a kitchen or utility cabinet system.

It is also envisioned that the containers could be removed from the apparatus and be used for curbside placement for collection purposes or be used for dumping the contents of waste material into bins or container for recycling or reuse thereby providing environmental benefits as a result of such recycling. The use of compost material enriched with organic materials from a typical kitchen has positive and beneficial results as a soil enhancer, as humus or as a fertilizing material.

What is claimed is:

1. A subassembly for a cabinet comprising a panel forming a substantially vertical front panel for a cabinet;

a housing having a generally planar support member operatively coupled in a substantially perpendicular position to said panel, said planar support member defining a first opening and a second opening each formed therein of a predetermined shape and cross-sectional area and each having a circumferential edge around said opening, said first opening and said second opening being substantially perpendicular to said panel;

a first container having a first selected cross-sectional area and depth and being formed of a material substantially impervious to moisture for receiving and storing material containing a high level of moisture for use in a compost mixture, said first container further including a first mounting member for hanging the first container by said first mounting member and removable cover to form a removable fluid tight seal to contain the moisture and odor of the stored material containing moisture within said first container, said first container being located at a first predetermined position within the first opening in said housing and supported in said first predetermined position by said circumferential edge of said first opening; and a second container having a second selected cross-sectional area and depth and being formed of a material for receiving and storing material containing a low level of moisture, said second container further including a second mounting member for hanging the second container by said second mounting member, said second container being located at a second predetermined position contiguous to said first container in said first predetermined position and within the second opening in said housing, said second container being supported in said second predetermined position by said circumferential edge of said second opening;

said first container and said second container being selected to have a total cross-sectional area which occupies substantially all of the cross-sectional area defining said first opening and said second opening.

2. The subassembly of claim 1 further comprising a slider mechanism oppressively coupled to said housing and to a cabinet frame for supporting said housing, said first container and said second container within said cabinet frame for forming a pull-out compost and dry storage cabinet section.

3. The subassembly of claim 1 wherein said first selected cross-sectional area is smaller than said second selected cross-sectional area.

4. The subassembly of claim 1 wherein said second container has a cover having a receiving opening therein to permit said material containing a low level of moisture to be deposited therein through said receiving opening.

5. The subassembly of claim 1 wherein said removable cover of said first includes a separate opening and fluid tight flip lid to permit said material containing a high level of moisture to be deposited therein through said separate opening.

6. The subassembly of claim 1 wherein said first container and said second container each include a supporting member as said first mounting member and said second mounting member, respectively, for hanging said first container and said second container in the first predetermined position and second predetermined position, respectively.

7. The subassembly of claim 6 wherein said first selected cross-sectional area is smaller than said second selected cross-sectional area.

8. The subassembly of claim 7 wherein said second container has a cover having a receiving opening therein to permit said material containing a low level of moisture to be deposited therein through said receiving opening.

9. The subassembly of claim 1 wherein the removable cover of said first container includes a separate opening and fluid tight flip lid to permit said material containing a high level of moisture to be deposited therein through said separate opening.

* * * * *